(12) United States Patent
White et al.

(10) Patent No.: US 6,850,941 B1
(45) Date of Patent: Feb. 1, 2005

(54) METHOD AND SYSTEM FOR NATIVE-BYTE FORM HANDLING

(75) Inventors: Eric White, Austin, TX (US); John Boyd, Austin, TX (US)

(73) Assignee: Vignette Corporation, Austin, TX (US)

( * ) Notice: Subject to any disclaimer, the term of this patent is extended or adjusted under 35 U.S.C. 154(b) by 499 days.

(21) Appl. No.: 10/027,383

(22) Filed: Dec. 21, 2001

Related U.S. Application Data
(60) Provisional application No. 60/257,387, filed on Dec. 21, 2000.

(51) Int. Cl.$^7$ .............................................. G06F 17/30
(52) U.S. Cl. .............................. 707/10; 707/10; 707/9; 709/218; 709/203; 709/224; 709/223; 709/225; 709/245; 715/506; 715/507
(58) Field of Search ................................ 709/203, 223, 709/225, 224, 218; 707/10, 9; 715/506, 507

(56) References Cited

U.S. PATENT DOCUMENTS

| | | | | |
|---|---|---|---|---|
| 5,740,430 A | * | 4/1998 | Rosenberg et al. | 707/200 |
| 6,192,415 B1 | * | 2/2001 | Haverstock et al. | 709/245 |
| 6,571,246 B1 | * | 5/2003 | Anderson et al. | 707/10 |
| 6,651,217 B1 | * | 11/2003 | Kennedy et al. | 715/507 |
| 2001/0034771 A1 | | 10/2001 | Hutsch et al. | |
| 2002/0065912 A1 | * | 5/2002 | Catchpole et al. | 709/224 |
| 2002/0165877 A1 | * | 11/2002 | Malcolm et al. | 707/507 |
| 2002/0178187 A1 | * | 11/2002 | Rasmussen et al. | 707/513 |
| 2003/0217117 A1 | * | 11/2003 | Dan et al. | 709/218 |
| 2004/0030697 A1 | * | 2/2004 | Cochran et al. | 707/9 |

OTHER PUBLICATIONS

U.S. patent application 09/931,228 A method and System for Determining a Network User's Locale, Aug. 16, 2001, Eric White.*

* cited by examiner

Primary Examiner—Srirama Channavajjala
Assistant Examiner—Kuen S Lu
(74) Attorney, Agent, or Firm—Sprinkle IP Law Group

(57) ABSTRACT

A method and system are provided for native-byte form handling, one embodiment comprising a method for encoding user-submitted native-byte form data in a client-server computer network. A user, at a client computer, can select a Uniform Resource Locator ("URL") with his or her web browser for access to a content provider's website. When accessing the content provider's web server, the client computer can transmit client computer specific information to the web server that can be used by the web server to determine the user's locale. The web server can determine the user's (client computer's) locale using, for example, an automatic locale detection algorithm, and forward the user's locale information to a back-end server. The content provider's back-end server can generate a locale-specific form having a pre-populated, uniquely-named field, using, for example, a dynamic page generation program. The locale-specific form can be served to the user's web browser for display to the user. The user can enter, on the locale-specific form, information that he or she wishes to submit to the content provider (e.g., a request for content). The user can transmit the form-entered data, including the pre-populated, uniquely-named field, to the content provider's web server. The web server can process the user form data, and an encoding object can be created, based on the value of the pre-populated field. The user form data can then be transcoded from its original encoding to a new encoding (e.g., the content provider's scripting environment encoding) and forwarded to the content provider's scripting environment.

1 Claim, 1 Drawing Sheet

METHOD AND SYSTEM FOR NATIVE-BYTE FORM HANDLING

RELATED INFORMATION

This application claims priority under U.S.C. § 119(e) to U.S. Provisional Patent Application No. 60/257,387, filed Dec. 21, 2000 entitled "An Automated Locale Detection System and Method," which is hereby fully incorporated by reference.

TECHNICAL FIELD OF THE INVENTION

This invention relates generally to the operation of client-server computer networks. More particularly, the present invention relates to methods and systems for delivering customized content, such as locale-sensitive content, to a user over a client-server computer network. Even more particularly, the present invention relates to a method and system for native-byte form handling to capture and represent a client computer's encoding preferences.

BACKGROUND OF THE INVENTION

The Internet, and in particular, the World Wide Web (WWW), is a large collection of computers operated under a client-server computer network model. In a client-server computer network, a client computer requests information from a server computer. In response to the request, the server computer provides the requested information to the client computer. Client computers are typically operated by individuals. Server computers are typically operated by large information providers, such as commercial organizations, government entities and universities.

To ensure the interoperability of the potentially different computers and computer operating systems in a client-server computer network, various protocols are observed. For example, the Hypertext Transport Protocol ("HTTP") is used for transporting hypertext files over the Internet. In addition, the WWW observes a number of protocols for organizing and presenting information, such as the Hypertext Markup Language ("HTML") protocol and the Extended Markup Language "XML") protocol.

The HTTP protocol, in particular, supports a feature known as "dynamically-generated customized pages." A dynamically generated customized page comprises a set of information in a particular format. The same set of information can be presented in various ways, depending upon whether a particular format is desired, and supported, by the requesting client computer. For example, a first client computer may support the ability to present information in columns, while a second client computer may instead support the ability to present information in the form of a table. As a further example, the first client computer may be operated by a user in a Spanish speaking locale, while the second computer is operated by a user located in an English speaking locale. A server computer receiving an information request from the first client computer may dynamically generate the requested content in a column format and in the Spanish language, while responding to a request from the second client computer by dynamically generating the requested content in English and in the form of a table. Thus, two different versions of the requested content can be created to represent the same information.

Computer executable instructions are used to dynamically generate customized content. U.S. Pat. Ser. No. 5,740,430, entitled "Method and Apparatus for Server Independent Caching of Dynamically-generated Customized Pages," issued on Apr. 14, 1998, to Rosenberg, et al. (the "Caching Application"), discloses a method and apparatus to efficiently respond to a large number of requests for customized content. In particular, the Caching Application discloses a method and apparatus for operating a client-server computer network such that a server computer dynamically generates and then stores customized pages requested from a client computer. Subsequent requests for previously generated customized pages (content) are responded to by retrieving the requested content from a cache in the server computer. Since previously generated customized pages need not be regenerated, computational overhead is reduced. The Caching Application is hereby incorporated by reference in its entirety.

Internet standards that govern web interactions, both at the semantic level, such as HTML (a content language) and HTTP (a transfer protocol) are derived from an ASCII (American Standard Code for Information Interchange) based environment. When using only ASCII, language is primarily restricted to English, or ASCII derivatives of Western European languages. Therefore, most meta information associated with content that comes across a network in HTTP is intended to be ASCII. Meta information is typically encoded information transmitted along with the main data in a data transfer to provide additional information associated with the main data, such as creation date, authorship, formatting, locale information, language, etc. However, with the proliferation of Internet use, Internet content providers are faced with the need to support, among others, multi-lingual website visitors. The problem exists, however, that there is no clear way for a multi-lingual website visitor to announce to a content provider his or her language preference. In fact, the problem goes beyond determining a user's language preference and is a problem of determining a user's locale preferences. A user's locale can indicate not only a user's language preferences, but also other locale-specific information, such as the user's time zone, which can be used to indicate relative time differences between the user and the content provider. For example, a time indicator can indicate whether the user's locale supports daylight savings time, which can be important in performing time calculations for the timing of events.

Further, it is important to content providers to be able to provide content to a website user in a format that is useful and familiar to the user. For example, date/time formats, currency formats, monetary symbols, the use of dashes, commas and periods, etc., can vary greatly from locale to locale. Even within a locale, language and format variances can occur. For example, Spanish has two sorting orders and Chinese has five. A content provider, therefore, has a need to know a variety of. demographic (locale-specific) information about a website user. Related U.S. patent application Ser. No. 09/931,228 entitled "A Method and System for Determining a Network User's Locale," which was filed on Aug. 16, 2001 (the "Locale Detection Application"), discloses a method and system for automatically determining a network user's locale by various methods, including by the use of headers in the HTTP standard, by default assignment of locale, and by form posting. The Locale Detection Application is hereby fully incorporated by reference.

An HTML form post via HTTP is a primary means for website visitors to submit information to a content provider, yet it provides one of the most formidable problems in locale-specific data handling. In order for Internet content providers to correctly interpret user submitted form data, the encoding of the form data must be made known to the content provider's server side programs. Unfortunately, HTML version 3.2 form tags do not supply sufficient information about the encoding of form submitted data to a content provider's servers. The issues surrounding HTML form post data handling are critical issues that must be resolved to correctly capture user form inputs in a multilingual website.

A form post is a documented HTTP call to transmit selected form data from a user to a content provider's web server so that the web server can receive and process the form contents. For example, when a user (e.g., via a web browser) is presented with a form, such as an address form, the user can input his or her first name, last name, street address, etc., into the form. The user's web browser can collect the user's keystrokes into special fields (e.g., name fields) and perform the form post once the user submits his or her data (e.g., by pressing the "enter" key). The user's web browser may have Javascript, for example, running locally in the user's client computer to verify that entries have been made into each field, but the web browser will not process the data. The processing will instead happen at the content provider's server(s).

However, current HTML versions cannot adequately handle form posts for a locale-sensitive environment because HTML v3.2 form tags do not supply sufficient encoding information for the submitted data. Thus, when a user at a client computer is entering data, before he or she sends the data to a server, a content provider must be able to determine the encoding of the entered data and transmit the encoding information (e.g., in the form of a marker) to its servers along with the submitted data. Further, a content provider's server must be able to detect the marker that is transmitted along with the encoded data to indicate the encoding. The encoding marker can indicate to the server whether, for example, the data was entered in shift-JIS, or some other ASCII specification. Thus, current form post methods and systems cannot properly process data in locale-sensitive form posts because they cannot provide a means to indicate the data's encoding at the client computer, nor can they properly determining form post data encoding at the content provider's web server. A content provider using such current methods can thus not accurately serve locale-specific content to a user in response to a form post. Instead, an explicit registration process may be required for a user to indicate his or her locale preferences.

However, casual visitors to a website may have concerns, for example, over on-line privacy, that may dissuade them from actively registering at a content provider's website. Many casual visitors may be reticent to register, but may still desire to access locale-specific content, or at least locale-specific navigation. Automatic locale detection, such as disclosed in the Locale Detection Application, along with a means to accurately detect and forward the encoding format of form data to a content provider's server side programs, can be used to provide locale-specific content even to casual website visitors.

SUMMARY OF THE INVENTION

Therefore, there is a need for a method and system for native-byte form handling that can comprise an easily distinguished form field format for submitting information from a client computer to a server computer in a client-server computer network. Such a native-byte form handling method and system can further comprise a means to detect the easily distinguished form field at the server computer to enable processing of the data.

Further, a need exists for a method and system for native-byte form handling that can interface with an automatic locale detection system, such as that disclosed in the Locale Detection Application, to detect a user's locale and present locale-sensitive content and/or a locale-sensitive interface to the user following a form post without requiring the user to explicitly enter his or her preferences.

An even further need exists for a method and system for native-byte form handling that can use a well known HTML form variable to hold the encoding representation of form posted data and thus allow a content provider's page generation processes to detect the explicit representation of the form filled data and perform requisite encoding translations for a scripting environment on the content provider's servers.

In accordance with the present invention, a method and system for native-byte form handling are provided that can substantially eliminate or reduce the disadvantages associated with prior art methods and systems for capturing locale-sensitive user information submitted to a content provider's website.

More specifically, the present invention provides a method and system for native-byte form handling, one embodiment comprising a method for encoding user-submitted native-byte form data in a client-server computer network. An embodiment of the present invention can comprise a user, at a client computer, selecting a Uniform Resource Locator "URL") with his or her web browser for access to a content provider's website. When accessing the content provider's web server, the client computer can transmit client computer specific information to the web server that can be used by the web server to determine the user's locale. The web server can determine the user's (client computer's) locale using, for example, an automatic locale detection algorithm, and forward the user's locale information to a back-end server.

The content provider's back-end server can generate a locale-specific form having a pre-populated, uniquely-named field, using, for example, a dynamic page generation program. The locale-specific form can be served to the user's web browser for display to the user. The user can enter, on the locale-specific form, information that he or she wishes to submit to the content provider (e.g., a request for content). The user can transmit the form-entered data, including the pre-populated, uniquely-named field, to the content provider's web server. The web server can process the user form data, and an encoding object can be created, based on the value of the pre-populated field. The user form data can then be transcoded from its original encoding to a new encoding (e.g., the content provider's scripting environment encoding) and forwarded to the content provider's scripting environment.

A technical advantage of the method and system for native-byte form handling of this invention is the ability to provide an easily distinguished form field format for submitting information from a client computer to a server computer in a client-server computer network.

Another technical advantage of the method and system for native-byte form handling of this invention is the ability to interface with an automatic locale detection system to detect a user's locale and present locale-sensitive content and/or a locale-sensitive interface to the user following a form post without requiring the user to explicitly enter his or her preferences.

An even further technical advantage of the method and system for native-byte form handling of this invention is the ability to use a well known HTML form variable to hold the encoding representation of form posted data and thus allow a content provider's page generation processes to detect the explicit representation of the form filled data and perform requisite encoding translations for a scripting environment on the content provider's servers.

BRIEF DESCRIPTION OF THE DRAWINGS

A more complete understanding of the present invention and the advantages thereof may be acquired by referring to the following description, taken in conjunction with the accompanying drawings, in which like reference numbers indicate like features and wherein.

DETAILED DESCRIPTION OF THE INVENTION

Figure 1:
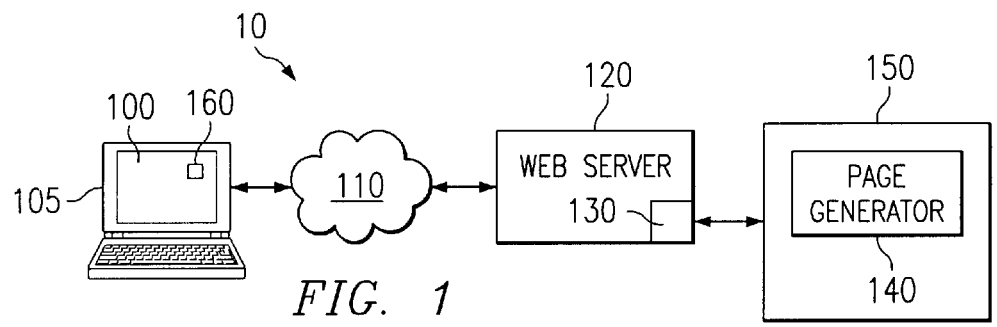
FIG. 1 is a simplified block-diagram of a client-server computer network 10 in which an embodiment of the method and system of the present invention can be implemented.

Preferred embodiments of the present invention are illustrated in the FIGUREs, like numerals being used to refer to like and corresponding parts of the various drawings.

The various embodiments of the method and system of the present invention can provide a means to detect and transmit the encoding of form data submitted by a website user and can create an encoding marker, indicating the detected encoding, that can be transmitted along with the submitted data to a content provider's back-end server(s). The back-end server(s) can detect encoding the marker to determine the data encoding and automatically transcode the data to a server encoding to generate and serve the requested content in a locale-sensitive manner to the user. Embodiments of the method and system of this invention can be used with, for example, the invention disclosed in the Locale Detection Application, as well as with cache management systems such as that disclosed in the U.S. patent application Ser. No. 09/965,914, entitled "Method and System for Cache Management of Dynamically-Generated Content," filed on Sep. 28, 2001 (the "Cache Management Application"). The Cache Management Application is hereby fully incorporated by reference.

The proposed HTML 4.01 standard addresses the HTML v3.2 form tag problem. In HTML 4.01, the accept-charset header attribute is added to the "Form" element using the format "Accept-Charset =Charset List." This attribute specifies a list of character encodings for input data that is accepted by the server processing the form. The value is a space- and/or comma-delimited list of charset values. The client must be able to interpret this list as an exclusive-or list (i.e. the server is able to accept any single character encoding per entity received). The default value for this attribute is a reserve string "unknown". User agents may interpret this value as the character encoding that was used to transmit the document containing the form element. However, the most popular current browsers, such as Netscape Navigator and Microsoft Internet Explorer, do not send this form attribute to content provider's web servers during form post operations.

To overcome the shortcomings of older HTML standards and of currently popular user agents such as Netscape Navigator and Microsoft Internet Explorer, the embodiments of the method and system of this invention can provide a form post hidden field to represent an HTTP user agent's language encoding. The form post hidden field of the embodiments of this invention can have, for example, the name "VGN_FORM_ENCODING." The formatting of the form post hidden field name can be any arbitrarily selected format, so long as it is consistent and can be easily distinguished by server-side processes. Once the form post (often "hidden") field is presented, it can take precedence over the locale detected through, for example, an automatic locale detection algorithm for the purpose of interpreting the user input form fields.

The hidden form post field can be set through various means. For example, it can be set in the scripting template that renders the form page, if the client encoding is known to the content provider's scripting environment. This can occur, for example, if the origin of a locale determined with a locale detection algorithm, such as that disclosed in the Locale Detection Application, is either "cookie" or "client," and the encoding field is not defaulted. Alternatively, if the client encoding is not known inside the content provider's scripting environment, the hidden form post field can be tied to a form post field that requires a visitor to explicitly input (e.g., via a SELECT control with multiple options for supported character encodings) his or her encoding format. The hidden form post field of the embodiments of this invention can also be used to update the-encoding component of a locale object obtained through an automatic locale detection algorithm if that component is defaulted. The value of the "VGN_FORM_ENCODING" form post field can take the form of an ISO or other industry standard encoding representation, such as ISO 8859-1, Shift-JIS, or EUC-JP.

In a typical HTTP form post, data that is collected by, for example, a client user's web browser, is transmitted to a content provider's web server for processing. Using an embodiment of the method and system of this invention, the encoding of the data that is transmitted can first be determined and a special encoding marker can be used to indicate the data encoding to the server processing the submitted user data. Without an indication of the data encoding, the web server will assume that all of the data is in ASCII format. This is because, although the HTTP standard does not define how to handle form data, it does assume that all data is provided in ASCII. Unless a web server is directed otherwise (i.e., the server is configured to handle different encodings), user data can only be submitted to a web server in an ASCII form.

This can be a problem, for example, on a multi-lingual website where non-standard characters may be used to submit and display data. For example, some Japanese names must be typed in Kanji using non-ASCII characters. User's having non-ASCII encoding formats must thus either first be presented with a form on which the user can indicate his or her encoding preferences, or an automatic locale detection algorithm can be used to automatically detect a user's locale preferences. It is contemplated that embodiments of the method and system of this invention can be used with an automatic locale detection algorithm, such as that of the Locale Detection Application.

Embodiments of the HTML form post field of the present invention can provide a means for capturing the encoding of data entered by a visitor to a content provider's website before the user submits the data to the content provider's web server. The encoding can be identified using an encoding marker inserted within the data sent back to the web sever. The web server can detect special characters in the encoding marker used to indicate the data type encoding of the data from the form post field. Thus, for example, an encoding marker within the user submitted data can be used to indicate that the user's encoding preference is in shift-JIS. The HTML form post field (e.g., "VGN_FORM_ENCODING") can thus be used to detect and indicate at a user's computer the user's data encoding format. The submitted data can then be processed in a locale-appropriate manner at the content provider's web server.

The VGN_FORM_ENCODING form post field can comprise a hidden field name in a form such that it is never displayed on a client computer (e.g., at a web browser) to a website user. The value of an encoding specification, such as ISO-8859-1, Shift-JIS, EC-JP, or any other form encoding, can be assigned to the hidden form post field name. A marker indicating the encoding can be embedded in the form post field so that when, for example, a user submits data to a content provider's web server, both the form data and the native-byte form encoding fields of this invention are sent across the network to a content provider's web server.

At a content provider's web server, the embodiments of the method of this invention can determine if the incoming user data contains the specially encoded form post field (e.g., the VGN_FORM_ENCODING field). An incoming form post submitted through a web server can have, for example, thirty elements, and the web server will scan every element in the form post for a VGN_FORM_ENCODING field. If it exists, the field will indicate the user data encoding preferences to the web server (e.g., by virtue of the encoding marker). The web server can thus determine the user submitted data encoding. The web server and its back-end related server systems can then process the user's data in a locale-sensitive manner.

A content provider's server(s) can thus process the user-submitted data based on its encoding. For example, in a TCL (Token Control Language) environment, all data must be in a UTF-8 encoding format because of the TCL scripting environment requirements. Thus, for a TCL-based server system, embodiments of the method and system of this invention can take, for example, incoming Shift-JIS encoded data and transcode the data into a UTF-8 encoding before it is passed to the TCL scripting environment. The embodiments of this invention can thus provide a well known form post field and a means to populate the values of the form post field to indicate the encoding of user-submitted data. The embodiments of this invention can also provide the capability, on the server side processing, to detect the form post field values and manipulate the submitted data to accomplish a desired function.

FIG. 1 is a simplified block-diagram of a client-server computer network 10 in which an embodiment of the method and system of the present invention can be implemented. Web browser 100 can be used by a website visitor to interface to a content provider's website and access, over a network 110, which can be the Internet, a web server 120 maintained by the content provider. Web server 120 can provide an applet 160, comprising computer executable software instructions for implementing the encoding marker of an embodiment of this invention, to web browser 100. Software applet 160 can be provided to client computer 105 (and hence to web browser 100) on the first instance of a user accessing web server 120.

Web server plug-in 130 can comprise computer executable software instructions, at web server 120, at web server 120, for executing the steps described herein for detecting an encoding marker within the submitted data. Web server plug-in 130 can process the encoding to transcode the form post data into the encoding of the content provider's scripting environment. Web server plug-in 130 can also be used to forward transcoded data to a back-end server 150, which can contain a page generator 140. Page generator 140 can be, for example, a TCL page generator, an ASP page generator, or a JSP page generator. Page generator 140 can generate and serve locale-sensitive content in response to the user's data submission as transcoded from the form post.

Embodiments of the method and system of this invention can comprise computer executable software instructions in the form of software applets that reside on both a client computer and on a web server for performing the functions described herein. Further, insertion of the form post field name (e.g., VGN_FORM_ENCODING) into a form that has been called need not be done automatically. Instead, the HTML form can be hand-coded to have a hidden field name within it. However, the value of the hidden field must still be populated because a content provider does not know on what browser, for example, the form will be displayed. This can be especially critical, for example, when serving multilingual content to user's in countries where many different encodings are possible. For example, a Taiwanese website advertising to mainland China may have to deal with different Eastern languages and different types of encoding, such as Japanese and Korean. The website owner (content provider) will need to first know locale-sensitive information about each user so as to map the correct encoding to each user. To accomplish this purpose, an automatic locale detection algorithm can be used. However, the embodiments of the native-byte form handling method and system of this invention do not require an automatic locale detection aspect to function.

One example of where automatic locale detection might not be used is when providing content to a country like Japan. In Japan, there are two major encoding types for Kanji; Shift-JIS and EAC-JP. Unfortunately, in Japan they are both used almost equally. Thus, about fifty percent of the time a user will be using the Shift-JIS encoding and about fifty percent of the time a website user will be using the EAC-JP encoding. An automatic locale detection algorithm, although fairly sophisticated, may have to default to one or the other encoding if all the algorithm can determine is that the user is from a Japanese locale. The automatic locale detection algorithm will thus be wrong fifty percent of the time. In this situation, a content provider will instead typically provide a selection mechanism so that the user can select a data encoding. For example, a toggle box can be provided and the value of the toggle box used to populate the VGN_FORM_ENCODING field. Thus, instead of automatically detecting a user's locale, a user is asked to explicitly indicate his or her locale preferences. As an alternative, the content provider could provide a front page on his or her website that performs an initial automatic locale detection and, in cases like that of a Japanese locale user, prompts the user to select an encoding preference. Embodiments of the method and system of this invention can thus be used independently of an automatic locale detection algorithm.

The embodiments of the method and system of this invention can thus provide an advantage over the prior art in that they can automatically transcode data from one encoding (e.g., a client computer encoding) to another encoding (e.g., a server computer encoding). Prior art methods required static encoding of a template for each encoding likely to be encountered by a server. The embodiments of this invention also provide the advantage of not requiring a user to register his or her preferences to receive locale-sensitive content following a form post. The embodiments of the method and system of this invention can work together with an automatic locale detection algorithm to determine the locale preference information (e.g., encoding) of a casual visitor to the website who may not want to explicitly register with the website. The native-byte form handling of the embodiments of the method and system of this invention can be achieved by, for example, on the browser side, hand-coding a form post field (e.g., VGN_FORM_ENCODING) into a form. A toggle box can also be hand-coded into the form. The essential part of the web browser side of an implementation of an embodiment of this invention is to have a form post field populated with an encoding value.

One way to do this is by automatic locale detection, as previously discussed. In such an embodiment, a user connects to a website, the user's locale is automatically detected, a form page is dynamically generated using, for example, a dynamic page generation system (such as that disclosed in the Cache Management Application), and the form page is served to the user with the form field value populated. Thus, in one embodiment of the method and system of this invention, a form can be dynamically generated with the native-byte form handling field filled out with an easily distinguished value for the encoding field.

A form can be delivered to a user by various means known to those in the art. The important aspect is to have the form filled out and the value of the form field populated. On the server side (before entry into a scripting environment), a content provider's web server can receive the form and inspect the form data, looking for the form field value. The value of the form field can substantiate an encoding object. An encoding object can be, for example, similar to the locale object disclosed in the Locale Detection Application. The encoding object, however, may include only the encoding of the data submitted by a user. It may not necessarily contain information relating to a user's locale other than the data encoding information.

In a scripting environment, it is desirable to have an encoding object, as opposed to an encoding argument, that can govern certain operations. For example, if a user visits a website that provides dynamic web page generation (such as in one embodiment of this invention), the dynamic web page generation requires data from a database, and objects and formatting to generate and present the requested content to a user. This dynamic web page generation takes place in a scripting environment, which can perform functions such as formatting strings, formatting currencies, performing date calculations, etc., that are locale- (e.g., encoding) sensitive. It is desirable to have an encoding object that will govern these operations so that when this type of data formatting is required, a command, such as a "format" command, can be used and one of the arguments to the command is the encoding object. The other arguments can be, for example, the month, the day and year or other such information. The format command can then return a value for that day, month and year in the proper locale-specific string for the intended environment.

An encoding object can thus be created that can have an arbitrary name that is easily identified. The name can be, as previously discussed, "VGN_FORM_ENCODING." The encoding object can be used to perform a transformation (transcoding) from the native-byte language of the user submitted data into the language or encoding required by a content provider's servers. For example, in a TCL environment, UTF-8 encoding is used, and so a transformation of the form data is performed to repackage the data in a TCL encoding prior to sending it into the scripting environment. Once in the scripting environment, a scripter (e.g., a TCL scripter), will not have to transcode the user's submitted data because it is already in the encoding of the scripting environment. The scripter can thus store the data in a database, park the data, or perform any other data manipulations he or she requires.

The embodiments of the method and system of this invention for native-byte form handling can thus pre-process data received from a user before it gets into a scripting environment. Once the data is provided to the scripting environment, it is completely up to a scripter to perform whatever functions he or she desires. This is possible because the data is transcoded automatically from the submitted form data encoding (native-byte language) to the language of the scripting environment. Once in the scripting environment, the native-byte form handling of the embodiments of this invention is complete and the scripter takes over. For example, a scripter may store the submitted data in a database. The embodiments of the method and system of this invention can comprise computer executable software instructions that can be part of another program within a content provider's server. For example, embodiments of this invention can be implemented as a set of software instructions within a page generation program, such as that disclosed in the Cache Management Application.

Figure 2:
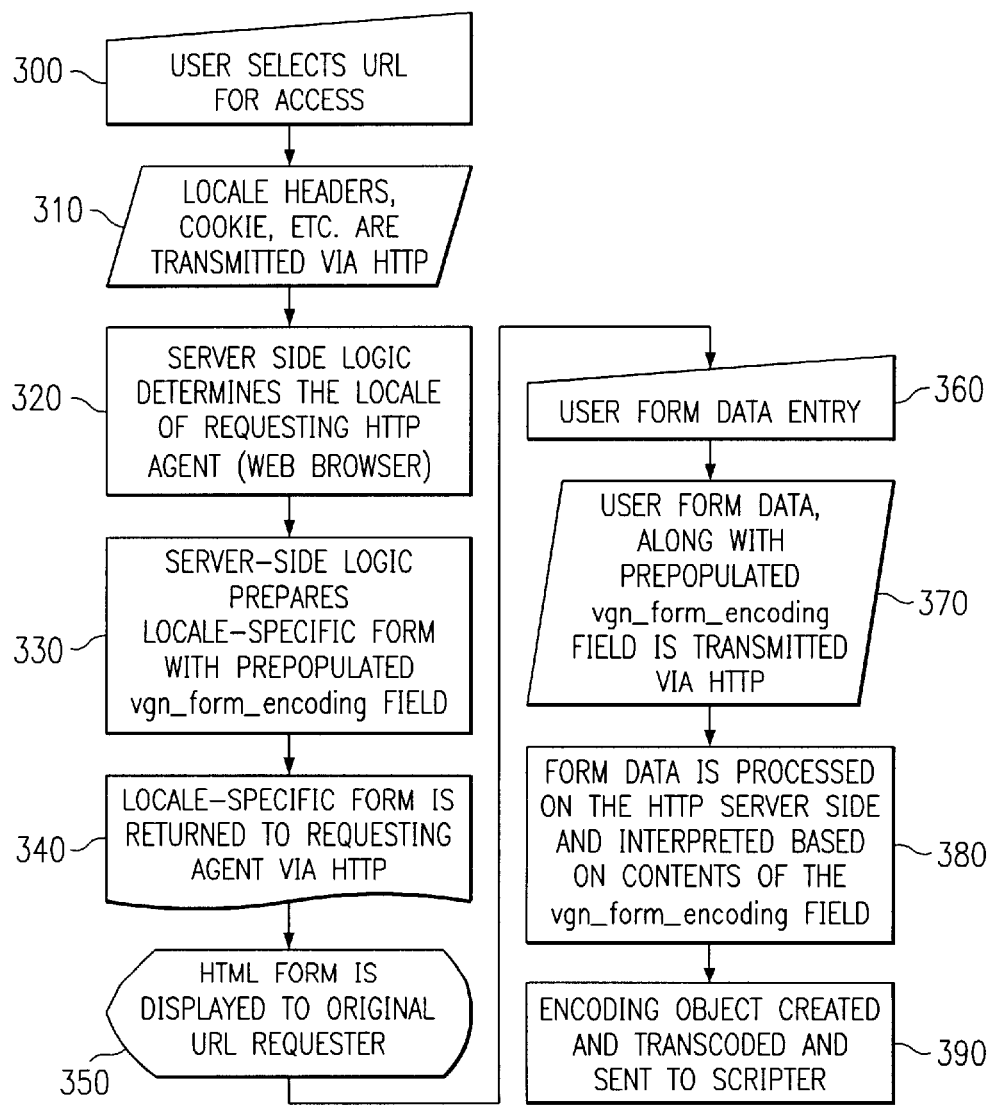
FIG. 2 is a flowchart diagram illustrating the operation of one embodiment of the native-byte form handling method and system of the present invention.

FIG. 2 is a flowchart diagram illustrating the operation of one embodiment of the native-byte form handling method and system of the present invention. At step 300, a user at a client computer 105 selects a URL for access to a content provider's website. At step 310, the user's web browser 100 transmits locale headers, cookies, etc., to the content provider's web server 120 via HTTP. At step 320, the web server-side logic determines the locale of the requesting HTTP agent (the user's web browser 100). Step 320 can be accomplished either by an automatic locale detection algorithm or by some explicit process, such as registration or a user sign in.

At step 330, server side logic at the content provider's website prepares a locale-specific form (which can be an HTML form) having a pre-populated, specially-named field, such as VGN_FORM_ENCODING, that can indicate the user's data encoding format. This form can be prepared, for example, by dynamic page generation methods such as disclosed in the Cache Management Application. At step 340, the locale-specific form is returned to the requesting agent (web browser 100) via the HTTP protocol.

At step 350, the HTML form is displayed to the user and, at step 360, the user can enter data that he or she wishes to submit to the content provider as form data. At step 370, the user form data, along with the pre-populated VGN_FORM_ENCODING field, is transmitted via HTTP to the content provider's web server. At step 380, the form data is processed on the HTTP server side (e.g., at web server 120) and interpreted based on the contents (value) of the VGN_FORM_ENCODING field. Further, at step 390, an encoding object can be created based on the value of the VGN_FORM_ENCODING field to transcode the user submitted form data to an encoding of the content provider's scripting environment or other content provider server encodings. The native-byte submitted data can be transcoded into the encoding used by the content provider's back-end servers using the encoding object. The transcoded data can be provided to a scripting environment. At this point, native-byte-form handling ends and the transcoded data is available to a scripter to manipulate as he or she requires.

The embodiments of the method and system of the present invention can thus provide a mechanism for transmitting native-byte form data, along with an indication of the form level character set encodings, to a content provider's server(s) for consumption and processing. The embodiments of this invention can indicate the encoding of submitted HTML form data for correct handling and support of possible character encoding transformations (e.g., from shift-JIS to UTF-8). In a multi-lingual website configuration, content entry for multiple simultaneous locales can thus be effectively supported via the name field approach discussed herein. The value of the specially-named field (e.g., VGN_FORM_ENCODING) can be detected during dynamic page script processing and can be used to accurately translate the encoding of the HTML form post user input data to an encoding representation appropriate for a targeted scripting environment. (e.g., UTF-8 for the TCL environment). The embodiments of the method and system of this invention thus can provide a means to transparently (to both the user and to a scripter in a content provider's scripting environment) submit data in a native-byte encoding and transcode the native-byte encoding into an encoding appropriate for the content provider scripting environment. The user can thus submit data in his or her native encoding, which can then be provided to a scripter in the scripter's native encoding in a manner transparent to both.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for encoding user-submitted native-byte form data in a client-server computer network, comprising:

at a client computer, said user selecting a Uniform Resource Locator ("URL") for access to a content provider web server, using a web browser;

transmitting, from said client computer, client computer specific information to said content provider web server via HTTP protocol;

determining, at said content provider web server, said client computer's locale using an automatic locale detection algorithm and forwarding said client computer's locale to a back-end server;

generating, at said back-end server, a locale-specific form having a pre-populated, uniquely-named field, using a dynamic page generation program;

serving said locale-specific form to said web browser via HTTP protocol;

displaying, on said web browser, said locale-specific form for said user;

entering, on said locale-specific form by said user, a set of user form data, at said client computer;

transmitting said set of user form data, including said pre-populated, uniquely-named field, to said web server via the HTTP protocol;

processing, at said web server, said set of user form data based on the value of said pre-populated, uniquely-named field;

creating an encoding object based on the value of said pre-populated, uniquely-named field;

transcoding said set of user form data with said encoding object to a, content provider scripting environment encoding; and forwarding said transcoded set of user form data to a content provider'scripting environment.

* * * * *